(12) United States Patent
Yukitake

(10) Patent No.: US 7,719,157 B2
(45) Date of Patent: May 18, 2010

(54) MOTOR AND ELECTRIC PUMP

(75) Inventor: Yasuhiro Yukitake, Kashiwara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 304 days.

(21) Appl. No.: 11/898,212

(22) Filed: Sep. 10, 2007

(65) Prior Publication Data

US 2008/0061645 A1    Mar. 13, 2008

(30) Foreign Application Priority Data

Sep. 11, 2006    (JP)    ............................ P2006-245489

(51) Int. Cl.
  *H02K 1/18*    (2006.01)
  *H02K 5/04*    (2006.01)
(52) U.S. Cl. ........... 310/216.049; 310/89; 310/216.055; 310/216.113; 417/423.14
(58) Field of Classification Search ............... 310/42, 310/89, 216.055, 216.113, 418, 216.052, 310/216.049; 29/596; 417/423.14
See application file for complete search history.

(56) References Cited

U.S. PATENT DOCUMENTS

| | | | | |
|---|---|---|---|---|
| 4,134,036 A | * | 1/1979 | Curtiss | 310/216.113 |
| 4,716,648 A | * | 1/1988 | Nel | 29/596 |
| 5,268,607 A | * | 12/1993 | McManus | 310/89 |
| 5,331,238 A | * | 7/1994 | Johnsen | 310/58 |
| 5,936,320 A | * | 8/1999 | Takeda et al. | 310/89 |
| 6,020,667 A | * | 2/2000 | Carey et al. | 310/216.049 |
| 6,836,051 B2 | * | 12/2004 | Hiwaki et al. | 310/254.1 |
| 6,949,850 B2 | * | 9/2005 | Dairi | 310/89 |
| 7,164,218 B2 | * | 1/2007 | Kimura et al. | 310/216.044 |
| 7,511,399 B2 | * | 3/2009 | Lung et al. | 310/216.055 |

FOREIGN PATENT DOCUMENTS

| | | | |
|---|---|---|---|
| JP | 1-264547 | * | 10/1989 |
| JP | 2005-168098 | | 6/2005 |
| JP | 2005-337025 | | 12/2005 |

* cited by examiner

*Primary Examiner*—Burton Mullins
(74) *Attorney, Agent, or Firm*—McGinn IP Law Group, PLLC

(57) ABSTRACT

A motor includes a rotor having a permanent magnet fitted thereon, and a stator having an inner peripheral surface spaced a predetermined distance from an outer peripheral surface of the rotor in opposed relation thereto, and the stator is press-fitted in a motor case to be fixed thereto with its outer peripheral surface. A plurality of projecting portions are formed on an inner peripheral surface of the motor case. Recess portions for engagement with the respective projecting portions are formed in the outer peripheral surface of the stator. When the stator is press-fitted into the motor case, the stator is fixed to the motor case with inner bottom surfaces of the recess portions serving as press-fitting surfaces. The projecting portions of the motor case are engaged respectively in the recess portions of the stator, thereby preventing the rotation of the stator relative to the motor case.

6 Claims, 4 Drawing Sheets compressive stress

RELATED ART

MOTOR AND ELECTRIC PUMP

BACKGROUND OF THE INVENTION

This invention relates to a motor and an electric pump.

One related motor disclosed, for example, in JP-A-2005-168098, is known. Namely, as shown in FIG. 6, the motor 91 has a cylindrical stator 93 fixed to an inner peripheral surface of a motor case 92. The stator 93 is formed by superimposing together a plurality of electromagnetic steel sheets each made of a steel material which is a magnetic material having high magnetic permeability. As shown also in FIG. 7, a plurality of teeth 93a are formed on and project from an inner peripheral surface of the stator 93 at predetermined intervals, and conductor wires are wound on these teeth to form coils 94.

As shown in FIG. 6, an output shaft 95 is inserted in and rotatably supported on the motor case 92 through a pair of bearings 96a and 96b, and a rotor 97 is mounted on the output shaft 95 for rotation therewith. A tubular magnet 98 is fixedly mounted on an outer peripheral surface of the rotor 97, and this magnet 98 is disposed in such a manner that its outer peripheral surface is opposed to the inner peripheral surface (more accurately, distal end surfaces of the plurality of teeth 93a) of the stator 93 through a slight clearance. Namely, the rotor 97 and the magnet 98 are rotatably supported in a space formed within the stator 93 (more accurately, generally defined by the distal end surfaces of the plurality of teeth 93a). The rotor 97 is rotated by a rotating magnetic field produced by energizing the coils 94.

The motor of this construction has been used as a power source of an electric pump suited for use as a fuel pump, a water pump, an oil pump, a hydraulic pump of a transmission, etc., for a vehicle. For example, an electric pump is disclosed in JP-A-2005-337025, in which in order to reduce the number of component parts and also to achieve a compact design, a single common shaft serves as an output shaft of a motor and also as a drive shaft of a pump.

However, in the above related motor, the stator is mounted on the motor case by press-fitting the former into the latter. Therefore, there has been a fear that following problem might be encountered. Namely, as shown in FIG. 7, the stator 93 is formed such that a transverse cross-section of its outer periphery has a circular shape, and the motor case 92 is formed such that a transverse cross-section of its inner periphery has a circular shape. The outer diameter of the stator 93 is substantially equal to or slightly smaller than the inner diameter of the motor case 92. When the stator 93 is forced or press-fitted into the motor case 92 through one open end thereof with a predetermined force, the stator 93 is fixed to the motor case 92, with its outer peripheral surface held in intimate contact with the inner peripheral surface of the motor case 92.

When the stator 93 is thus press-fitted into the motor case 92 to be fixed thereto, the stator 93 receives a compressive force (external stresses) from the motor case 92 over the entire periphery thereof. As a result, compressive stresses (internal stresses) directed outward from its center occurs in the stator 93. It is commonly known that when such compressive stresses occurs in the stator 93, magnetic properties of the stator 93 are adversely affected, so that iron loss (core loss) increases. In order to suitably prevent the rotation of the stator 93 relative to the motor case 92, it is necessary to secure a certain degree of press-fit interference which is the dimensional difference between the outer diameter of the stator 93 and the inner diameter of the motor case 92. However, as the press-fit interference increases, the compressive stresses occurring in the stator 93 increases and hence the iron loss increase. Further, as the iron loss of the stator 93 increases, the amount of heat generated in the motor 91 increases, which leads to a lowered efficiency of the motor 91. These problems are encountered commonly with the type of motors in which a stator is press-fitted in a motor case to be fixed thereto as in the above related motor.

In recent years, there is still a tendency for vehicles to be computerized, and therefore it has been required to further reduce power consumption. Motors also are not an exception, and it has been required to secure a higher efficiency. Furthermore, in the case where the motor is used as the drive source of the above electric pump, the lowered efficiency of the motor leads to a lowered output power of the electric pump. In this respect, also, it has been strongly desired to secure the still higher efficiency of the motor.

SUMMARY OF THE INVENTION

This invention has been made in order to solve the above problems, and an object of the invention is to provide a motor and an electric pump, in which iron loss, occurring in a stator when press-fitting the stator into a motor case to fix it thereto, is reduced, thereby securing the efficiency of the motor and the electric pump.

An exemplary embodiment of the motor of the present invention may include a motor case, rotor including an outer peripheral surface, a stator including an inner peripheral surface spaced a predetermined distance from the outer peripheral surface of the rotor in opposed relation thereto, the stator being press-fitted into the motor and an engagement structure provided between the outer peripheral surface of the stator and an inner peripheral surface of the motor case for engaging a part of the stator with a part of the motor case to prevent the stator from rotating relative to the motor case.

The motor may also include an engagement structure which includes a recess portion and a projecting portion for engagement in the recess portion, and one of the recess portion and the projecting portion is formed at the outer peripheral surface of the stator, and the other of the recess portion and the projecting portion is formed at the inner peripheral surface of the motor case.

The stator may be press-fitted into the motor case, a distal end portion of the projected portion is press-fitted to an inner bottom surface of the recess portion.

A clearance may be formed between the outer peripheral surface of the stator and the inner peripheral surface of the motor case when the stator is press-fitted into the motor case.

The stator may be press-fitted into the motor case, a portion of the outer peripheral surface of the stator other than portion at which the recess portion or the projecting portion is formed is press-fitted to the inner peripheral surface of the motor case.

A depth of the recess portion of the stator may be larger than a height of the projecting portion of the motor case, or a height of the projecting portion of the stator may be smaller than a depth of the recess portion of the motor case.

The recess portion formed at one of the stator and the motor case may extend over an entire length thereof in a direction of an axis thereof, and the projecting portion formed at the other of the stator and the motor case may extend over an entire length thereof in a direction of an axis thereof.

The recess portion may include inner side surfaces which are tapering surfaces opposed to each other in a circumferential direction thereof in such a manner that the distance between the tapering surfaces decreases or increases gradually toward the one of the stator and the motor case, and the projecting portion may include outer side surfaces which are tapering surfaces facing away from each other in a circumferential direction thereof in such a manner that the distance between the tapering surfaces increases or decreases gradually toward the other of the stator and the motor case.

An electric pump may include the motor, and a single common shaft may serve as an output shaft of the motor and as a drive shaft of a pump.

According to the present invention, part of the stator is engaged with part of the motor case, thereby preventing the rotation of the stator relative to the motor case. Therefore, press-fit interference which is the dimensional difference between the outer diameter of the stator and the inner diameter of the motor case can be reduced. Therefore, compressive stresses occurring in the stator when press-fitting the stator into the motor case are reduced. Therefore, iron loss due to these compressive stresses can be reduced.

According to the present invention, when the stator is press-fitted into the motor case, the recess portion formed at one of the stator and the motor case is engaged with the projecting portion formed at the other. With this simple construction in which one of the recess portion and the projecting portion is formed at the stator while the other is formed at the motor case, the rotation of the stator relative to the motor case is prevented. Therefore, in contrast with the case where the stator is fixed to the motor case merely by press-fitting the former into the latter, the press-fit interference (here, the dimensional difference between the depth of the recess portion of the stator and the height of the projection portion of the motor case or the dimensional difference between the height of the projecting portion of the stator and the depth of the recess portion of the motor case) can be reduced. And besides, in the invention, the inner bottom surface of the recess portion or the distal end surface of the projecting portion serves as the press-fitting surface, and therefore the area of the press-fitting surface is made smaller as compared with the case where the entire outer peripheral surface of the stator serves as a press-fitting surface. Therefore, compressive stresses occurring in the stator are reduced. As a result, iron loss due to these compressive stresses can be reduced.

According to the present invention, when the stator is press-fitted into the motor case, the recess portion formed at one of the stator and the motor case is engaged with the projecting portion formed on the other. With this simple construction in which one of the recess portion and the projecting portion is formed at the stator while the other is formed at the motor case, the rotation of the stator relative to the motor case is prevented. Therefore, in contrast with the case where the stator is fixed to the motor case merely by press-fitting the former into the latter, the press-fit interference can be reduced. And besides, in the invention, the portion of the outer peripheral surface of the stator other than the portion thereof at which the recess portion or the projecting portion is formed serves as the press-fitting surface, and therefore the area of the press-fitting surface is reduced by an amount corresponding to the area of an opening of the recess portion or the area of the projecting portion as compared with the case where the entire outer peripheral surface of the stator serves as a press-fitting surface. Therefore, compressive stresses occurring in the stator are reduced. As a result, iron loss due to these compressive stresses can be reduced.

According to the present invention, a compressive force acts only on the inner bottom surface of the recess portion or the distal end surface of the projecting portion of the stator through the projection portion or the recess portion of the motor case. In other words, the compressive force from the motor case will not act on the outer peripheral surface of the stator except the portion thereof at which the recess portion or the projecting portion is formed. The clearance is formed between the outer peripheral surface of the stator and the inner peripheral surface of the motor case when the stator is press-fitted in the motor case, and therefore in the case where the stator is formed by laminating a plurality of electromagnetic steel sheets together, conduction loss between the electromagnetic steel sheets is suppressed. Therefore, the efficiency of the motor is enhanced.

According to the present invention, when the stator is press-fitted into the motor case, a clearance is formed between the distal end surface of the projecting portion of the motor case and the inner bottom surface of the recess portion of the stator or between the inner bottom surface of the recess portion of the motor case and the distal end portion of the projecting portion of the stator. Namely, the distal end surface of the projecting portion of the motor case will not abut against the inner bottom surface of the recess portion of the stator, or the inner bottom surface of the recess portion of the motor case will not abut against the distal end surface of the projecting portion of the stator. With this construction, the outer peripheral surface of the stator is positively held in intimate contact with the inner peripheral surface of the motor case. Even in this case, compressive stresses occurring in the stator are reduced. Therefore, iron loss caused to occur in the stator by these compressive stresses can be reduced.

According to the present invention, the force of engagement between the projecting portion and the recess portion is suitably secured, and therefore the rotation of the stator relative to the motor case can be suitably prevented.

According to the present invention, the engagement of the projecting portion with the recess portion is made through the engagement of the tapering surfaces of the projecting portion with the tapering surfaces of the recess portion, and therefore the smooth engaging relation is obtained.

Iron loss of the stator greatly affects characteristics of the motor. According to the present invention, iron loss occurring in the stator is reduced. As a result, the efficiency of the motor is improved, and therefore the efficiency of the electric pump is improved.

In the present invention, iron loss, occurring in the stator when press-fitting the stator into the motor case to fix it thereto, is reduced, thereby securing the efficiency of the motor and the electric pump.

DESCRIPTION OF PREFERRED EMBODIMENTS

First Embodiment

A motor according to a first embodiment of the present invention will now be described with reference to FIGS. 1 to 3. The motor is used as a drive source, for example, for auxiliary equipments of a vehicle such as a water pump, an oil pump, a pump for a transmission, etc.

(Overall Construction)

Figure 1:
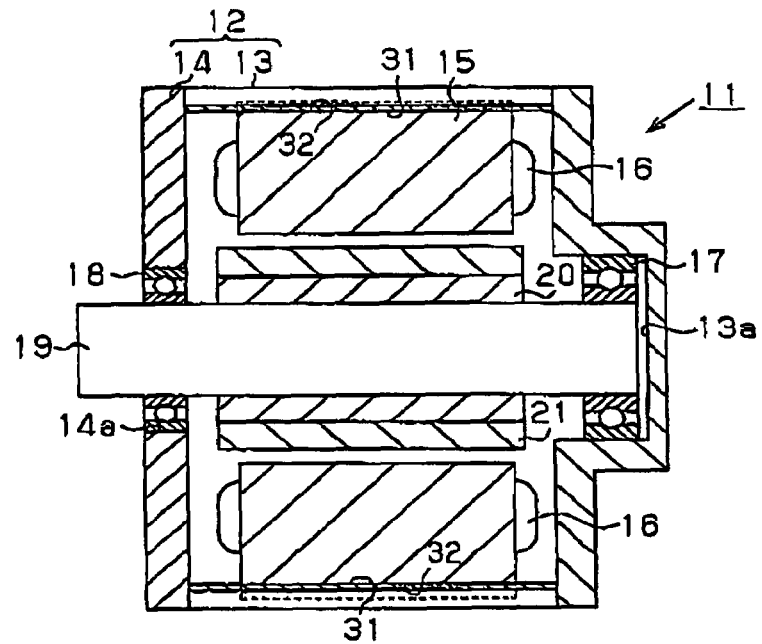
FIG. 1 is a longitudinal cross-sectional view of a first embodiment of a motor of the present invention.

As shown in FIG. 1, the motor 11 includes a motor case 12 made of metal. The motor case 12 comprises a case body 13 of a cylindrical shape having a closed bottom (closed end) and an open end, and a disc-shaped cover 14 closing the open end of the case body 13. A cylindrical stator 15 having opposite open ends is press-fitted in an inner peripheral surface of the motor case 12 (more accurately, the case body 13) to be fixed thereto. The stator 15 is formed by superimposing together a plurality of electromagnetic steel sheets each made of a steel material which is a magnetic material having high magnetic permeability. As shown in FIG. 2, a plurality of (six in this embodiment) teeth 15a are formed on and project from an inner peripheral surface of the stator 15 at predetermined intervals, and conductor wires are wound on these teeth to form coils 16.

Figure 2:
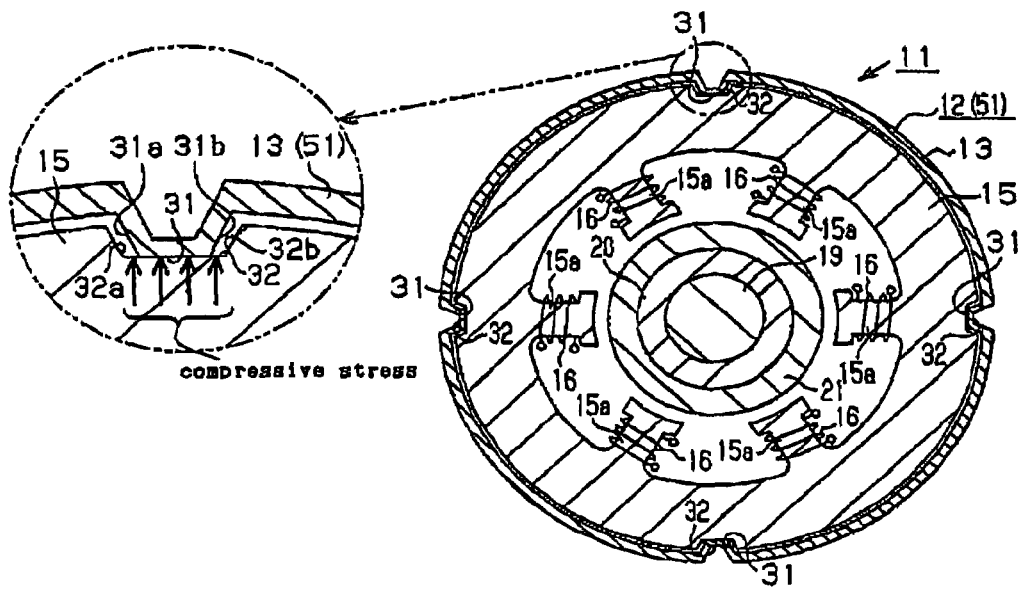
FIG. 2 is a transverse cross-sectional view of the motor.
Figure 3:
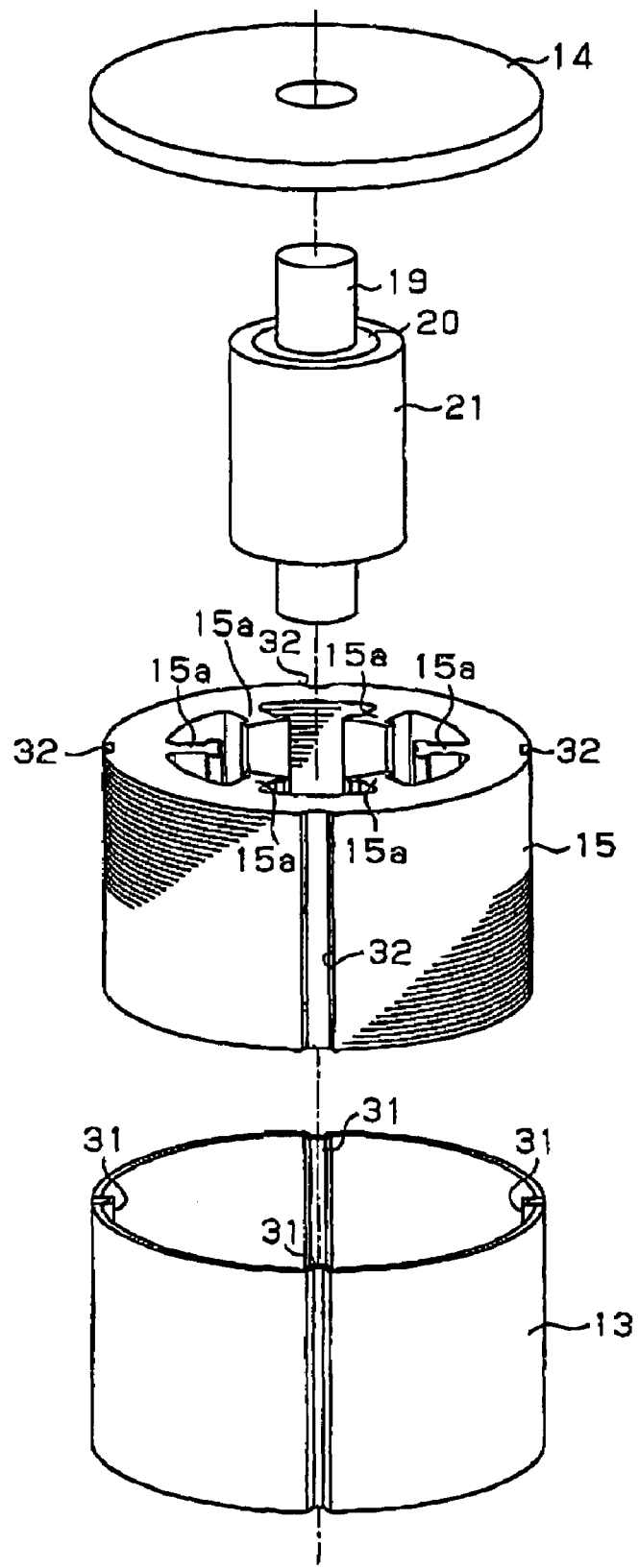
FIG. 3 is an exploded perspective view of the motor.

As shown in FIG. 2, a slight clearance is formed between an outer peripheral surface of the stator 15 and the inner peripheral surface of the motor case 12 (more accurately, the case body 13) over their entire peripheries. An engagement structure is provided between the outer peripheral surface of the stator 15 and the inner peripheral surface of the case body 13, and is constructed such that part of the stator 15 are engaged with part of the case body 13 to prevent rotation of the stator 15 relative to the case body 13. With this construction, the rotation of the stator 15 relative to the case body 13 is prevented. This engagement structure will hereafter be more fully described.

As shown in FIG. 1, a bearing receiving portion 13a in the form of a recess is formed in an inner bottom surface of the case body 13, and a bearing (rolling bearing) 17 is press-fitted in the bearing receiving portion 13a to be fixed thereto. A through hole 14a is formed through a central portion of the cover 14, and a bearing 18 is press-fitted in the through hole 14a to be fixed thereto. An output shaft 19 is inserted in the motor case 12, and is rotatably supported on the motor case 12 through the pair of bearings (rolling bearings) 17 and 18. One end portion of the output shaft 19 extends through the cover 14 to project to the exterior.

Within the motor case 12, a cylindrical rotor 20 having opposite open ends is mounted or fitted on the output shaft 19 for rotation therewith, and a cylindrical permanent magnet 21 having opposite open ends is fixedly mounted or fitted on an outer peripheral surface of the rotor 20. Thicknesses of the rotor 20 and permanent magnet 21 and a height (amount of projecting) of the teeth 15a from the inner peripheral surface of the stator 15 are so determined that a slight clearance is formed between an outer peripheral surface of the permanent magnet 21 and the inner peripheral surface (more accurately, distal end surfaces of the teeth 15a) of the stator 15. Namely, the outer peripheral surface of the permanent magnet 21 is opposed to the distal end surfaces of the teeth 15a through the slight clearance. Therefore, the rotor 20 having the permanent magnet 21 fixedly fitted thereon is rotated by a rotating magnetic field produced by energizing the coils 16.

(Engagement Structure)

Next, the engagement structure for engaging the stator and the motor case with each other will be described. As shown in FIG. 2, the motor case 12 has the inner periphery which is circular in transverse cross-section (plane surface made by cutting through the motor case 12 at right angles to its centerline or axis). A plurality of (four in this embodiment) projecting portions (convex portions) 31 are formed on the inner peripheral surface of the motor case 12 (more accurately, the case body 13). As shown also in FIG. 3, the projecting portions 31 are formed by pressing or the like, and extend continuously over the entire length of the motor case 12 in the direction of the axis thereof. As shown in FIG. 2, the four projecting portions 31 are arranged at equal intervals in the circumferential direction of the case body 13. Tapering surfaces 31a and 31b are formed respectively on outer side surfaces of each projecting portion 31 facing away from each other in the circumferential direction, and are inclined to approach each other gradually in a direction toward the center (axis) of the motor case 12.

As shown in FIG. 2, the stator 15 has the outer periphery which is circular in transverse cross-section (plane surface made by cutting through the stator 15 at right angles to its centerline or axis). A plurality of (four in this embodiment) recess portions (concave portions) 32 are formed in the outer peripheral surface of the stator 15. For forming the recess portions 32, an outer peripheral edge portion of each of the plurality of electromagnetic steel sheets for forming the stator 15 is stamped out by pressing or the like at four sections thereof to form four notches, and then these electromagnetic steel sheets are superimposed together in such a manner that the notches of the electromagnetic steel sheets are disposed in aligned relation to form the four recess portions 32 extending continuously over the entire length of the stator 15 in the direction of the axis thereof as best shown in FIG. 3. As shown in FIG. 2, the four recess portions 32 are arranged at equal intervals in the circumferential direction of the stator 15 in corresponding relation to the respective projecting portions 31 of the motor case 12. Tapering surfaces 32a and 32b are formed respectively on inner side surfaces of each recess portion 32 opposed to each other in the circumferential direction, and are inclined to approach each other gradually in a direction toward the center (axis) of the stator 15. A depth of the recess portion 32 is slightly smaller than a height (amount of projecting) of the projecting portion 31 from the inner peripheral surface of the case body 13.

The outer diameter of the stator 15 (except at the recess portions 32) is slightly smaller than the inner diameter of the motor case 12 (except at the projecting portions 31). The distance between distal end surfaces of each pair of diametrically-opposed projecting portions 31 and 31 of the motor case 12 is slightly smaller than the distance between inner bottom surfaces of each pair of diametrically-opposite recess portions 32 and 32 of the stator 15 facing away from each other. Namely, the difference between the distance between the distal end surfaces of the two diametrically-opposed projecting portions 31 and 31 of the motor case 12 and the distance between the inner bottom surfaces of the two diametrically-opposite recess portions 32 and 32 of the stator 15 serves as press-fit interference when press-fitting the stator 15 into the case body 13 through the open end thereof.

As described above, the stator 15 is press-fitted into the case body 13 through the open end thereof, and is fixed to the inner peripheral surface of the case body 13. More accurately, the stator 15 is fixed to the distal end surfaces of the four projecting portions 31 of the case body 13 (that is, fixed between the distal end surfaces of the four projecting portions 31), with the inner bottom surfaces of the four recess portions 32 serving as press-fitting surfaces. In this condition shown in FIG. 2, a slight clearance is formed between the outer peripheral surface of the stator 15 and the inner peripheral surface of the case body 13. Namely, the inner bottom surfaces (serving as the press-fitting surfaces) of the four recess portions 32 of the stator 15 receive a compressive force (external stresses) through the four projecting portions 31 of the motor case 12. As a result, although compressive stresses directed outward from the center of the stator 15 occur in those portions of the stator 15 corresponding respectively to the inner bottom surfaces (serving as the press-fitting surfaces) of the four recess portions 32, compressive stresses will not occur in the other portions of the stator 15. Thus, the press-fitting portions of the stator 15 relative to the motor case 12 are limited to the inner bottom surfaces of the recess portions 32, and therefore the portions of the stator 15 in which the compressive stresses occur are limited to the portions of the stator 15 corresponding respectively to the inner bottom surfaces of the recess portions 32. In contrast with the case where the stator 15 is fixed to the inner peripheral surface of the motor case 12, with its entire peripheral surface serving as a press-fitting surface, the total area of the press-fitting surfaces is greatly reduced, and therefore the compressive stresses occurring in the stator 15 are suitably suppressed.

As described above, it is commonly known when internal stresses occur in the stator 15, the magnetic properties of the stator 15 are adversely affected, so that iron loss increases. Here, the term "iron loss" means loss (lost electric energy) produced when applying a rotating magnetic field to a stator composed of electromagnetic steel sheets laminated together. The iron loss, together with copper loss (which is electric energy loss caused by resistances of conductor wires of coils), lowers the efficiency of an electric machine such as a motor. The iron loss is expressed by the sum of hysteresis loss and eddy current loss. The hysteresis loss is loss produced when a direction of magnetic field of a magnetic domain of an iron core (here, the electromagnetic steel sheets forming the stator 15) is changed by an alternating magnetic field. The eddy current loss is caused by eddy current produced in the iron core (here, the electromagnetic steel sheets forming the stator 15).

As described above, in this embodiment, the occurrence of compressive stresses in the stator 15 is suppressed, and therefore the deterioration of the magnetic properties due to the compressive stresses is suitably suppressed. Therefore, the amount of heat generated in the motor 11 is reduced by the reduction of the iron loss, so that the efficiency of the motor 11 is secured.

Furthermore, in this embodiment, the compressive force acts on the inner bottom surfaces of the recess portions 32 through the distal end surfaces of the projecting portions 31, and the projecting portions 31 of the motor case 12 are engaged respectively in the recess portions 32 of the stator 15. With this construction, the stator 15 is prevented from rotation relative to the motor case 12. In this embodiment, a rotation prevention force of such a degree that even when a lock torque (torque obtained when the output shaft 19 is restrained) is applied to the motor 11 can be secured, thereby the rotation of the stator 15 relative to the motor case 12 is prevented.

Therefore, the interference for the press-fitting of the stator 15 in the motor case 12 can be reduced by an amount corresponding to the force of engagement between the projecting portions 31 and the recess portions 32. Therefore, the press-fit interference can be reduced to a minimum, and the compressive stresses occurring in the portions of the stator 15 corresponding to the inner bottom surfaces (serving as the press-fitting surfaces) of the four recess portions 32 can be further reduced. Therefore, the magnetic properties of the stator 15 can suitably be secured.

Incidentally, it may be considered to plastically deform the motor case 12 inwardly from the exterior by pressing or the like to form the projecting portions 31 after the stator 15 is received within the motor case 12. In this case, however, there is a fear that the stator 15 within the motor case 12 may be damaged. And besides, it is difficult to control the amount of deformation of the motor case 12. In this embodiment, the stator 15 is press-fitted into the motor case 12 having the preformed projecting portions 31, with the recess portions 32 of the stator 15 disposed correspondingly to the respective projecting portions 31 thereby fixing the stator 15 to the motor case 12. Therefore there is no such fear.

Therefore, in this embodiment, the following advantages can be obtained.

(1) In the motor 11, the stator 15 including the inner peripheral surface spaced a predetermined distance from the outer peripheral surface of the rotor 20 (on which the permanent magnet 21 is fitted) in opposed relation thereto is press-fitted in the motor case 12 to be fixed thereto, with its outer peripheral surface serving as the press-fitting surface. In the motor 11, the engagement structure is provided between the outer peripheral surface of the stator 15 and the inner peripheral surface of the motor case 12, and is constructed such that part of the stator 15 are engaged with part of the motor case 12 to prevent the rotation of the stator 15 relative to the motor case 12.

Thus, by engaging part of the stator 15 with part of the motor case 12, the stator 15 is prevented from rotating relative to the motor case 12. With this construction, the press-fit interference which is the dimensional difference between the outer diameter of the stator 15 and the inner diameter of the motor case 12 can be reduced. Therefore, internal stresses occurring in the stator 15 when press-fitting the stator 15 into the motor case 12 to fix it thereto are suppressed, and therefore iron loss due to these internal stresses can be reduced. Therefore, the amount of heat generated in the motor 11 is reduced, so that the efficiency of the motor 11 can be secured.

(2) More specifically, the above engagement structure is formed into the following construction. Namely, the engagement structure includes the recess portions 32 formed in the outer peripheral surface of the stator 15, and the projecting portions 31 formed on the inner peripheral surface of the motor case 12 so as to be engaged respectively in the recess portions 32 of the stator 15. When the stator 15 is press-fitted into the motor case 12, the stator 15 is fixed to the motor case 12 with the inner bottom surfaces of the recess portions 32 serving as the press-fitting surfaces.

Thus, the recess portions 32 are formed in the stator 15, and the projecting portions 31 are formed on the motor case 12, and with this simple construction the rotation of the stator 15 relative to the motor case 12 is prevented. Therefore, in contrast with the case where the stator 15 is fixed to the motor case 12 merely by press-fitting the former into the latter, the press-fit interference can be reduced. And besides, the inner bottom surfaces of the recess portions 32 of the stator 15 serve as the press-fitting surfaces, and with this construction the total area of the press-fitting surfaces is made smaller as compared with the case where the entire outer peripheral surface of the stator 15 serves as a press-fitting surface. Therefore, compressive stresses occurring in the stator 15 are reduced. And besides, iron loss due to these compressive stresses can be reduced.

(3) The clearance is formed between the outer peripheral surface of the stator 15 and the inner peripheral surface of the motor case 12 when the stator 15 is press-fitted into the motor case 12.

Therefore, the compressive force (external stresses) acts only on the inner bottom surfaces of the recess portions 32 of the stator 15 through the projecting portions 31 of the motor case 12. Namely, the occurrence of compressive stresses in the outer peripheral surface of the stator 15 except the portions thereof at which the recess portions 32 are formed is suitably suppressed. And besides, since the clearance is formed between the stator 15 and the motor case 12 in the condition in which the stator 15 is press-fitted in the motor case 12, conduction loss between the electromagnetic steel sheets forming the stator 15 is suppressed. Therefore, the efficiency of the motor is enhanced.

(4) The projecting portions 31 are formed to extend over the entire length of the motor case 12 in the axial direction thereof, and also the recess portions 32 are formed to extend over the entire length of the stator 15 in the axial direction thereof.

Therefore, the force of engagement between the projecting portions 31 of the motor case 12 and the recess portions 32 of the stator 15 is suitably secured. Therefore, the rotation of the stator 15 relative to the motor case 12 can be suitably prevented.

(5) The tapering surfaces 32*a* and 32*b* are formed respectively on the inner side surfaces of each recess portion 32 of the stator 15 opposed to each other in the circumferential direction, and the distance between the two tapering surfaces 32*a* and 32*b* is increasing gradually outward. Also, the tapering surfaces 31*a* and 31*b* are formed respectively on the outer side surfaces of each projecting portion 31 of the motor case 12 facing away from each other in the circumferential direction, and the distance between the two tapering surfaces 31*a* and 31*b* is decreasing gradually toward the center of the motor case 12.

Therefore, the tapering surfaces of each recess portion 32 of the stator 15 are engaged respectively with the tapering surfaces of the corresponding projecting portion 31 of the motor case 12. Therefore, the smooth engaging relation between the stator 15 and the motor case 12 is obtained.

(6) In recent years, there is still a tendency for vehicles to be computerized, and therefore it has been required to further reduce power consumption. Under the circumstances, the motor 11 of this embodiment is suited for mounting on a vehicle. This is because the improvement of the efficiency of the motor leads to the reduction of power consumption.

Second Embodiment

Next, a second embodiment of the invention will be described. This embodiment differs from the above first embodiment in that those portions of a stator serving as press-fitting surfaces are different from the portions of the above stator 15 serving as the press-fitting surfaces. Therefore, those constituent members and portions similar to those of the first embodiment will be designated by identical reference numerals, respectively, and detailed explanation thereof will be omitted.

Figure 4:
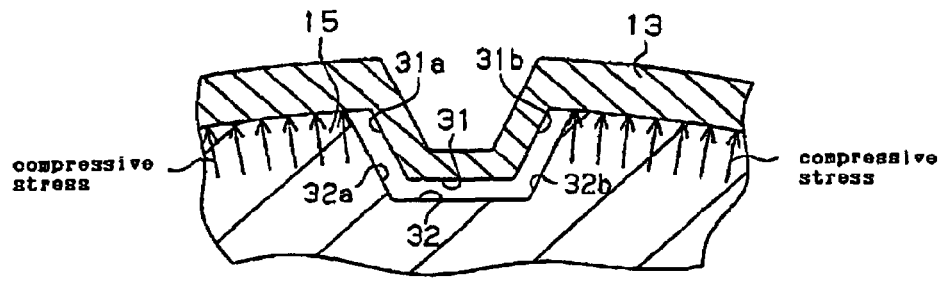
FIG. 4 is a transverse cross-sectional view of an important portion of a second embodiment of a motor of the invention.

As shown in FIG. 4, a depth of each recess portion 32 is larger than a height (amount of projecting) of a projecting portion 31 from an inner peripheral surface of a case body 13. An outer diameter of the stator 15 (except at the recess portions 32) is slightly larger than an inner diameter of a motor case 12. Namely, the dimensional difference between the inner diameter of the motor case 12 and the outer diameter of the stator 15 serves as press-fit interference when press-fitting the stator 15 into the case body 13 through an open end thereof. The distance between distal end surfaces of each pair of diametrically-opposed projecting portions 31 and 31 of the motor case 12 is slightly larger than the distance between inner bottom surfaces of each pair of diametrically-opposite recess portions 32 and 32 of the stator 15 facing away from each other. Therefore, when the stator 15 is press-fitted into the motor case 12, a very small clearance is formed between the distal end surface of each projection 31 and the inner bottom surface of the corresponding recess portion 32.

Therefore, the outer peripheral surface of the stator 15 except the portions thereof corresponding to the recess portions 32 serves as the press-fitting surface for press-fitting to the inner peripheral surface of the motor case 12. The portions (serving as the press-fitting surfaces) of the outer peripheral surface of the stator 15 other than the portions corresponding to the four recess portions 32 receive a compressive force through those portions of the inner peripheral surface of the motor case 12 other than the portions thereof corresponding to the four projecting portions 31. As a result, although compressive stresses directed outward from the center of the stator 15 occur in the portions (serving as the press-fitting surfaces) of the outer peripheral surface of the stator 15 other than the portions corresponding to the four recess portions 32, compressive stresses will not occur in the remaining portions of the stator 15, that is, those portions corresponding respectively to the recess portions 32. Therefore, in contrast with the case where the stator 15 is fixed to the inner peripheral surface of the motor case 12, with its entire peripheral surface serving as a press-fitting surface, the total area of the press-fitting surfaces is reduced by an amount equal to the total area of openings of the four recess portions 32, and therefore the occurrence of compressive stresses in the stator 15 is suitably suppressed.

Therefore, in this embodiment, the following advantages can be obtained.

(1) The engagement structure for preventing the rotation of the stator 15 relative to the motor case 12 is formed by the four projecting portions 31 of the motor case 12 and the four recess portions 32 of the stator 15. When the stator 15 is press-fitted into the motor case 12, the stator 15 is fixed to the inner peripheral surface of the motor case 12, with the portions of the outer peripheral surface of the stator 15 other than the portions thereof corresponding to the recess portions 32 serving as the press-fitting surfaces.

When the stator 15 is press-fitted into the motor case 12, the projecting portions 31 of the motor case 12 are engaged respectively in the recess portions 32 of the stator 15, thereby preventing the rotation of the stator 15 relative to the motor case 12. With this construction, the press-fit interference which is the dimensional difference between the outer diameter of the stator 15 and the inner diameter of the motor case 12 can be reduced. Therefore, compressive stresses, occurring in the stator 15 when press-fitting the stator 15 into the motor case 12 to fix it thereto, are suppressed, and therefore iron loss due to these compressive stresses can be reduced. Therefore, the amount of heat generated in the motor 11 is reduced, so that the efficiency of the motor 11 can be secured.

(2) And besides, with the simple construction in which the recess portions 32 are formed in the stator 15 while the projecting portions 31 are formed on the motor case 12, the rotation of the stator 15 relative to the motor case 12 is prevented.

(3) Furthermore, as described above, the rotation of the stator 15 relative to the motor case 12 is prevented by the engaging relation between the recess portions 32 of the stator 15 and the projecting portions 13 of the motor case 12. Therefore, in contrast with the case where the stator 15 is fixed to the motor case 12 merely by press-fitting the former into the latter, the press-fit interference can be reduced. Therefore, the total area of the press-fitting surfaces is reduced by an amount corresponding to the total area of the openings of the recess portions 32 as compared with the case where the entire outer peripheral surface of the stator 15 serves as a press-fitting surface. As a result, internal stresses occurring in the stator 15 are reduced, and therefore iron loss due to these internal stresses can be reduced.

The depth of each recess portion 32 of the stator 15 is larger than the height (amount of projecting) of the projecting portion 31 of the motor case 12.

Therefore, when the stator 15 is press-fitted into the motor case 12, a clearance is formed between the distal end surface of the projecting portion 31 of the motor case 12 and the inner bottom surface of the recess portion 32 of the stator 15. Namely, the distal end surface of the projecting portion 31 of the motor case 12 will not abut against the inner bottom surface of the recess portion 32 of the stator 15. This surely avoids a situation in which a compressive force is applied from each projecting portion 31 to the portion of the stator 15 corresponding to the inner bottom surface of the corresponding recess portion 32.

Third Embodiment

Next, a third embodiment of the invention directed to an electric pump will be described. This electric pump is used as an auxiliary equipment of a vehicle such as a water pump, an oil pump, a pump for a transmission, etc. Those constituent members and portions similar to those of the above first embodiment will be designated by identical reference numerals, respectively, and detailed explanation thereof will be omitted.

Figure 5:
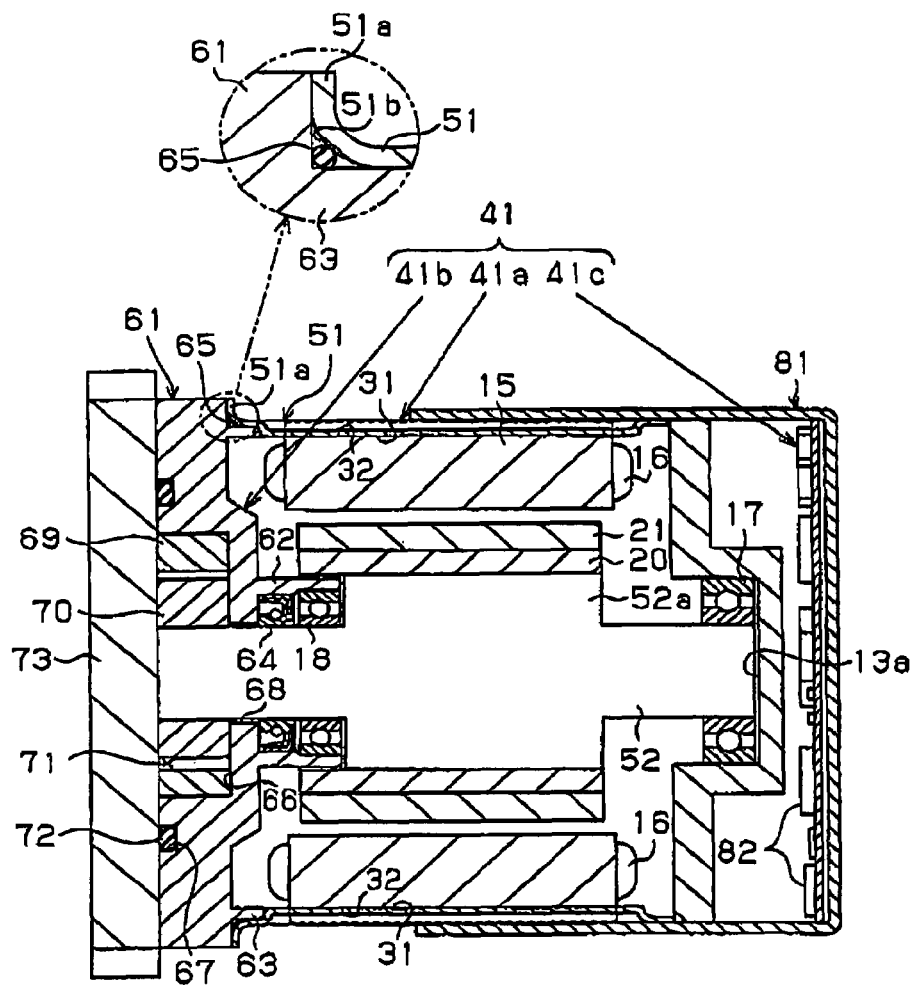
FIG. 5 is a longitudinal cross-sectional view of a third embodiment of the invention directed to an electric pump.
Figure 6:
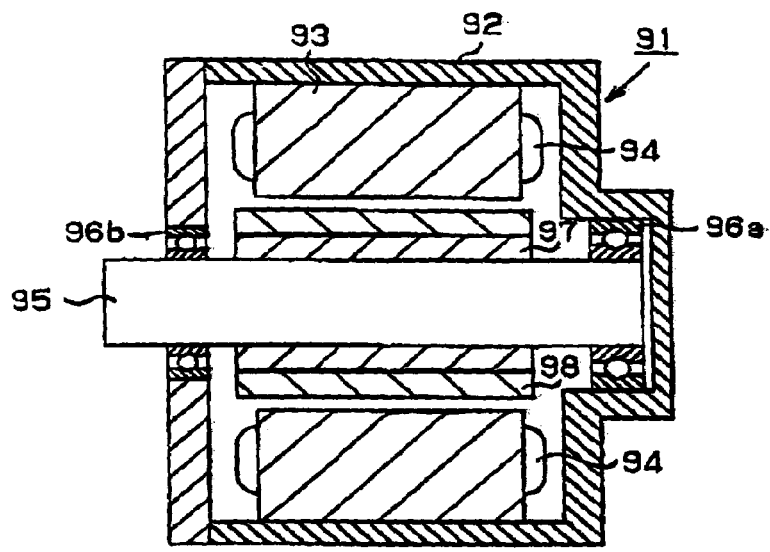
FIG. 6 is a longitudinal cross-sectional view of a related motor.
Figure 7:
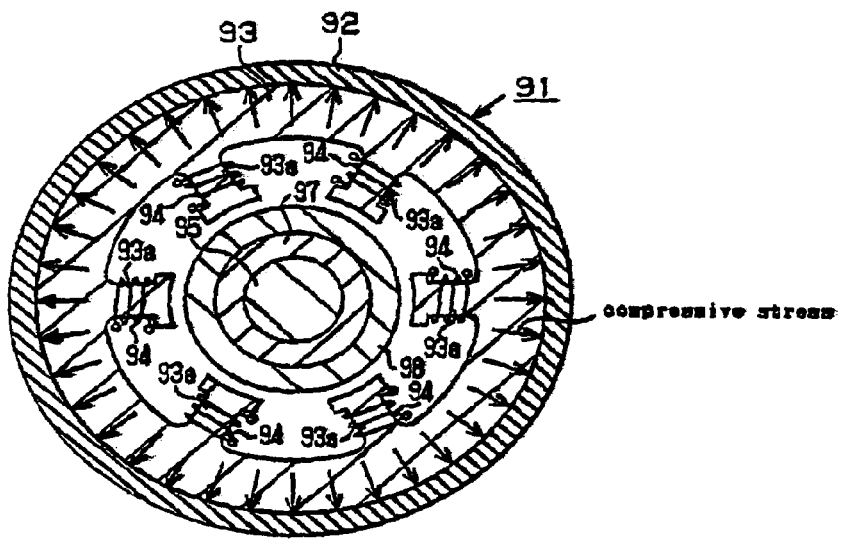
FIG. 7 is a transverse cross-sectional view of the related motor.

As shown in FIG. 5, the electric pump 41 comprises a motor 41a serving as a drive source for this pump, a gear pump 41 driven by a driving force of the motor 41a, and a control board 41c for controlling the driving of the motor 41a, the motor 41a, the gear pump 41 and the control board 41c being assembled together into a unitary structure.

(Motor)

The motor 41a includes a motor case 51 of a cylindrical shape having a closed bottom (closed end) and an open end (left end in FIG. 5), and an annular flange 51a is formed on a peripheral edge of the open end portion. An outer surface (left side surface in FIG. 5) of the flange 51a and an inner peripheral surface of the motor case 51 are smoothly interconnected by an arcuate surface 51b. A cylindrical stator 15 having opposite open ends is press-fitted in the inner peripheral surface of the motor case 51 to be fixed thereto as described above for the motor of the first embodiment. An engagement structure is provided between an outer peripheral surface of the stator 15 and the inner peripheral surface of the motor case 51, and is constructed such that part of the stator 15 are engaged with part of the motor case 51 to prevent rotation of the stator 15 relative to the motor case 51. Namely, a plurality of projecting portions 31 are formed on the inner peripheral surface of the motor case 51, and recess portions 32 equal in number to the projecting portions 31 are formed in the outer peripheral surface of the stator 15 so as to correspond respectively to the projecting portions 31 (see FIG. 2). In this embodiment, the projecting portions 31 are formed only on that portion of the motor case 51 corresponding to the stator 15 as shown in FIG. 5. A slight clearance is formed between the outer peripheral surface of the stator 15 and the inner peripheral surface of the motor case 51 over the entire peripheries thereof (except those regions corresponding to the recess portions 32) (see FIG. 2).

Conductor wires are wound on a plurality of teeth (not shown) (which are formed on an inner peripheral surface of the stator 15) to form coils 16. A bearing receiving portion 13a in the form of a recess is formed in an inner bottom surface of the motor case 51, and a bearing 17 is press-fitted in the bearing receiving portion 13a to be fixed thereto. One end portion of an output shaft 52 is inserted in the motor case 51 through the open end thereof, and is rotatably supported on the motor case 51 through the bearing 17. The other end portion of the output shaft 52 projects to the exterior through the open end of the motor case 51.

As shown in FIG. 5, a larger-diameter portion 52a is formed at a central portion of the output shaft 52. A cylindrical rotor 20 having opposite open ends is fitted on the larger-diameter portion 52a for rotation therewith, and a cylindrical permanent magnet 21 having opposite open ends is fixedly mounted or fitted on the rotor 20. A slight clearance is formed between an outer peripheral surface of the permanent magnet 21 and the inner peripheral surface (tore accurately, distal end surfaces of the teeth (not shown)) of the stator 15.

(Pump)

The gear pump 41b includes a pump case 61 mounted on the open end portion of the motor case 51. An inner tubular portion 62 is formed on a central portion of an inner side surface of the pump case 61 facing the motor case 51, and an outer tubular portion 63 is formed on an outer peripheral portion of this inner side surface in concentric relation to the inner tubular portion 62. A bearing 18 and an oil seal 64 are mounted on an inner peripheral surface of the inner tubular portion 62, and are arranged in this order from a distal end of this inner tubular portion 62. An O-ring 65 is mounted on a proximal end portion of the outer tubular portion 63.

On the other hand, a gear receiving chamber 66 of a cylindrical shape is formed in that side surface (outer side surface) of the pump case 61 facing away from the motor case 51, the gear receiving chamber 66 being open to this outer side surface of the pump case 61. An annular groove 67 is formed in the outer side surface of the pump case 61 in surrounding relation to the gear receiving chamber 66. A passage hole 68 for the passage of the output shaft 52 therethrough is formed through a bottom wall of the gear receiving chamber 66, and the interior of the gear receiving chamber 66 communicates with the interior of the inner tubular portion 62 via the passage hole 68. An annular outer gear 69 having a tooth profile formed on its inner peripheral surface is mounted within the gear receiving chamber 66 so as to rotate in sliding contact with the inner peripheral surface of the gear receiving chamber 66. A cylindrical inner gear 70 having a tooth profile formed on its outer peripheral surface is mounted within the inner periphery of the outer gear 69, and is mesh with the outer gear 69 in eccentric relation thereto. A space formed between the tooth profile of the outer gear 69 and the tooth profile of the inner gear 70 serves as a pump chamber 71.

For mounting the pump case 61 on the motor case 51, the outer tubular portion 63 is inserted into the open end portion of the motor case 51 while the outer end portion of the output shaft 52 is inserted into the inner tubular portion 62, and by doing so the pump case 61 is mounted on the motor case 51 to close the open end of this motor case 51. The outer end portion of the output shaft 52 is rotatably supported by the bearing 18, and extends through the passage hole 68, and is connected to the inner gear 70 within the gear receiving chamber 66 for rotation therewith. In this condition, the oil seal 64 forms a liquid-tight seal between the gear receiving chamber 66 and the motor case 51. The outer end portion of the output shaft 52 is connected to the inner gear 70 in such a manner that its axis of rotation is eccentric or offset from the axis of rotation of the inner gear 70, and therefore when the motor 41a is driven to be rotated, the inner gear 70 is rotated in an eccentric manner.

When the pump case 61 is thus mounted on the motor case 51, the O-ring 65 mounted on the outer tubular portion 63 is pressed against the flange 51a, and is compressed. As a result, a water-tight seal is formed between the pump case 61 and the motor case 51 and more specifically between the outer tubular portion 63 and the open end portion of the motor case 51. An O-ring 72 is mounted in the groove 67 in the pump case 61. Then, when a pump plate 73 is mounted on the outer side surface of the pump case 61, the gear receiving chamber 66 receiving the outer gear 69 and the inner gear 70 therein is closed by this pump plate 73, and also the O-ring 72 on the pump case 61 is compressed by the pump plate 73, so that a liquid-tight seal is formed between the gear receiving chamber 66 and the pump plate 73.

(Control Board)

A control board case 82 of a cylindrical shape having a closed bottom (closed end) and an open end is fitted on the end portion of the motor case 51 remote from the open end thereof, and is fixed thereto. The control board 41c is mounted within the control board case 81. Various electronic parts 82 such as a microcomputer, etc., are mounted on a front surface of the control board 41c.

When the motor 41a is driven in accordance with instructions from the control board 41c, the inner gear 70 is rotated together with the output shaft 52, and the outer gear 69 is also rotated in accordance with the rotation of the inner gear 70. As a result, the pump chamber 71 formed between the tooth profile of the inner gear 70 and the tooth profile of the outer gear 69 moves in the direction of rotation of the inner and outer gears 70 and 69, and the volume of this pump chamber 71 continuously increases and decreases. As a result, the suction and discharge of a liquid such as fuel, water or oil are effected via a suction port (not shown) and a discharge port (not shown).

Therefore, in this embodiment, the following advantages can be obtained.

(1) In the electric pump 41, the motor 41a and the gear pump 41b are formed into the unitary structure, and also the single common shaft serves as the output shaft of the motor 41a and also as the drive shaft of the gear pump 41b. In the motor 41a of this electric pump 41, the engagement structure is provided between the outer peripheral surface of the stator 15 and the inner peripheral surface of the motor case 51, and is constructed such that part of the stator 15 are engaged with part of the motor case 51 to prevent the rotation of the stator 15 relative to the motor case 51. More specifically, the recess portions 32 are formed in the outer peripheral surface of the stator 15, and the projecting portions 31 for engagement in the respective recess portions 32 of the stator 15 are formed on the inner peripheral surface of the motor case 51. When the stator 15 is press-fitted into the motor case 51, the stator 15 is fixed to the motor case 51, with the inner bottom surfaces of the recess portions 32 serving as the press-fitting surfaces.

Therefore, as in the first embodiment, the press-fit interference which is the dimensional difference between the outer diameter of the stator 15 and the inner diameter of the motor case 51 can be reduced. Therefore, internal stresses, occurring in the stator 15 when press-fitting the stator 15 into the motor case 51 to fix it thereto, are suppressed, and therefore iron loss due to these internal stresses can be reduced. Therefore, the efficiency of the motor 41a and hence the efficiency of the electric pump 41 can be secured.

(2) The rotation of the stator 15 relative to the motor case 51 is prevented by the engaging relation between the recess portions 32 of the stator 15 and the projecting portions 31 of the motor case 51. Therefore, in contrast with the case where the stator 15 is fixed to the motor case 51 merely by press-fitting the former into the latter, the press-fit interference (which is the difference between the distance between the inner bottom surfaces of the diametrically-opposite recess portions 32 of the stator 15 and the distance between the distal end surfaces of the diametrically-opposed projecting portions 31 of the motor case 51) can be reduced. Therefore, the force required for press-fitting the stator 15 into the motor case 51 can be reduced. Therefore, the deformation of the open end portion of the motor case 51 occurring when press-fitting the stator 15 into the motor case 51 is suppressed. As a result, the lowering of the liquid-tight seal effect due to the deformation of the open end portion of the motor case 51 can be avoided.

Incidentally, in the case where the stator 15 is fixed to the motor case 51 merely by press-fitting the former into the latter, the effect of preventing the rotation of the stator 15 relative to the motor case 12 by the engaging relation between the projecting portions 31 and the recess portions 32 is not obtained, and therefore it is necessary to increase the press-fit interference to compensate for this. And, the force required for the press-fitting operation increases with the increase of the press-fit interference. Therefore, when press-fitting the stator 15 into the motor case 51, a large force acts on the edge of the open end portion of the motor case 51, which leads to a fear that this end edge may be deformed. Further, there is a fear that the liquid-tight seal formed between the outer tubular portion 63 and the open end portion of the motor case 51 by the O-ring 65 may be adversely affected by this deformation. In this embodiment, the press-fitting force can be reduced as described above, and therefore the deformation of the open end portion of the motor case 51 can be suitably suppressed.

Other Embodiments

The above embodiments may be modified in the following manner.

In the first embodiment, a flange 51a may be formed at the open end (or edge) of the case body 13, and an outer tubular portion 63 may be formed on the inner surface of the cover 14. An O-ring 65 may be mounted on a proximal end portion of this outer tubular portion 63, and in this condition the outer tubular portion 63 is inserted into the open end portion of the case body 13, thereby forming a liquid-tight seal between the case body 13 and the cover 14. In this case, also, the deformation of the open end portion of the case body 13 occurring when press-fitting the stator 15 can be suppressed, since the force required for press-fitting the stator 15 into the case body 13 is reduced.

In the first to third embodiments, although there are provided the four projecting portions 31 and the four recess portions 32 corresponding respectively to the four projecting portions 31, similar advantages to those of the first to third embodiments can be obtained when at least one projecting portion 31 and at least one recess portion 32 are provided.

In the first to third embodiments, although the projecting portions 31 are formed integrally with the motor case 12, 51 by plastically deforming the relevant portions of the motor case inwardly by pressing or the like, the projecting portions 31 may be formed by separate members, respectively. In this case, the projecting portions 31 comprising the respective separate members are fixed to the motor case 12, 51 by bolts or any other suitable means.

In the first to third embodiments, the projecting portions 31 are formed on the motor case 12, 51 to extend continuously over the entire length thereof in the axial direction thereof, while the recess portions 32 are formed in the stator 15 to extend continuously over the entire length thereof in the axial direction thereof. However, each of the projecting portions 31, as well as each of the recess portions 32, may be interrupted or divided into a plurality of sections spaced from each other in the axial direction. With this construction, similar advantages to those of the first to third embodiments can be obtained.

In the first to third embodiments, although the stator 15 is formed by superimposing together the plurality of electromagnetic steel sheets each made of a steel material which is a magnetic material having high magnetic permeability, the stator may be formed by a sintered metal material. Even in this case, compressive stresses occurring in the stator 15 when press-fitting the stator 15 into the motor case 12, 51 can be reduced.

In the third embodiment, the engagement structure provided between the stator 15 and the motor case 51 can be replaced by the engagement structure of the second embodiment. Even in this case, similar advantages to those of the third embodiment can be obtained.

In the first to third embodiments, although the outer shape of the stator 15 is a circular, it may be, for example, a polygonal shape such as a square shape or a pentagonal shape. In this case, the inner periphery of the motor case 12, 51 is formed into a shape corresponding to the outer shape of the stator 15. In this case, corner portions (apex portions) of the stator 15 are engaged respectively in corner portions of the inner peripheral surface of the motor case 12, 51, so that the rotation of the stator 15 relative to the motor case 12, 51 is prevented. In another modified example, the outer shape of the stator 15 may be oval. In this case, the inner periphery of the motor case 12, 51 is formed into a shape corresponding to the outer shape of the stator 15, and by doing so, the rotation of the stator 15 relative to the motor case 12, 51 can be prevented. Thus, the stator 15 can have any suitable shape in so far as the shape of its inner periphery is circular.

In the first to third embodiments, the concave-convex engaging relation between the stator 15 and the motor case 12, 51 may be reversed. Namely, projecting portions 31 are formed on the stator 15, while recess portions 32 are formed in the motor case 12, 51. In this case, similar advantage to those of the first to third embodiments can be obtained.

The motor 11 of each of the first and second embodiments can be used as a drive source of an electric power steering apparatus for applying a steering assisting force to a steering mechanism (for changing the direction of wheels through an operation of a steering wheel) in accordance with a steering torque applied to the steering wheel, or as a hydraulic pressure-generating source of a hydraulic power steering apparatus. In this case, since iron loss occurring in the stator 15 is reduced, the efficiency of the motor 11 and hence an output power of the electric power steering apparatus or the hydraulic steering apparatus can be suitably secured.

The motor 11 of each of the first and second embodiments can be used as a drive source of other industrial machines (e.g. a machine tool) than the vehicle.

Other Technical Ideas

Technical ideas which can be grasped from the above embodiments and other examples of the invention will be explained in the following.

In the motor according to the present invention, the projecting portion or the recess portion of the motor case is formed by plastically deforming the relevant portion of the motor case. In this construction, the projecting portion or the recess portion is formed integrally with the motor case, and therefore the number of the component parts is prevented from increasing.

In the motor according to the present invention, the plurality of recess portions are formed at one of the stator and the motor case, and the plurality of projecting portions are formed at the other, and the projecting portions are engaged respectively in the recess portions at equal intervals in the circumferential direction. With this construction, the force of engagement of the stator relative to the motor case is exerted uniformly in the circumferential direction.

According to the invention, there is provided an electric power steering apparatus for applying a steering assisting force to a steering mechanism, in which the motor according to the present invention is used as a drive source of the electric power steering apparatus. Iron loss of the stator greatly affects the characteristics of the motor. In this construction, however, since the motor according to the present invention is used, iron loss occurring in the stator is reduced. As a result, the efficiency of the motor is improved, and therefore the efficiency of the electric power steering apparatus is improved.

What is claimed is:

1. A motor comprising:
   a motor case;
   a rotor including an outer peripheral surface;
   a stator including an inner peripheral surface spaced a predetermined distance from the outer peripheral surface of the rotor in opposed relation thereto, the stator being press-fitted into the motor case; and
   an engagement structure provided between an outer peripheral surface of the stator and an inner peripheral surface of the motor case for engaging a part of the stator with a part of the motor case to prevent the stator from rotating relative to the motor case,
   wherein the engagement structure comprises recess portions and protecting portions for engagement in the recess portions,
   wherein the recess portions are formed at one of the inner peripheral surface of the motor case and the outer peripheral surface of the stator, and the projecting portions are formed at the other one of the inner peripheral surface of the motor case and the outer peripheral surface of the stator, and
   wherein a height of each of the projecting portions is greater than a depth of each of the recess portions, such that only distal ends of the projecting portions and inner bottom faces of the recess portions are press-fitted with each other.

2. The motor according to claim 1, wherein the recess portions extend over an entire length of the stator in a direction parallel to an axis of the stator, and the projecting portions extend over an entire length of the motor case in a direction parallel to the axis.

3. The motor according to claim 1, wherein each of the recess portions includes inner side surfaces which are tapering surfaces opposing each other in a circumferential direction of the stator in such a manner that a distance between the inner side surfaces increases gradually toward the motor case, and each of the projecting portions includes outer side surfaces which are tapering surfaces facing away from each other in a circumferential direction of the motor case in such a manner that a distance between the outer side surfaces decreases gradually toward the stator.

4. An electric pump comprising the motor according to claim 1, and a single common shaft serving as an output shaft of the motor and as a drive shaft of the electric pump.

5. A motor comprising:
   a motor case;
   a rotor including an outer peripheral surface;
   a stator including an inner peripheral surface spaced a predetermined distance from the outer peripheral surface of the rotor in opposed relation thereto, the stator being press-fitted into the motor case; and
   an engagement structure provided between an outer peripheral surface of the stator and an inner peripheral surface of the motor case for engaging a part of the stator with a part of the motor case to prevent the stator from rotating relative to the motor case, wherein the engagement structure comprises a recess portion and a protecting portion for engagement in the recess portion, and one of the recess portion and the protecting portion is formed at the outer peripheral surface of the stator, and the other of the recess portion and the protecting portion is formed at the inner peripheral surface of the motor case, wherein, when the stator is press-fitted into the motor case, a portion of the outer peripheral surface of the stator other than a portion at which the recess portion or the projecting portion is formed is press-fitted to the inner peripheral surface of the motor case, and wherein a depth of the recess portion of the stator is larger than a height of the projecting portion of the motor case, or a height of the projecting portion of the stator is smaller than a depth of the recess portion of the motor case.

6. An electric pump comprising the motor according to claim 5, and a single common shaft serving as an output shaft of the motor and as a drive shaft of the electric pump.

* * * * *